Patented Nov. 16, 1948

2,453,847

UNITED STATES PATENT OFFICE 2,453,847

PROCESS FOR ACCELERATING ALUMINA HYDROSOL FORMATION BY AERATION

Charles N. Kimberlin, Jr., Baton Rouge, La., assignor to Standard Oil Development Company, a corporation of Delaware No Drawing. Application March 14, 1946, Serial No. 654,502

4 Claims. (Cl. 252—313)

The present invention is concerned with an improved process for the preparation of alumina hydrosols. It is particularly directed to an improved method for securing substantial increased yields of alumina hydrosols in shorter periods of time. In accordance with the present process, an oxygen containing gas is utilized for treating the acid solution of the amalgamated aluminum.

It is known in the art as disclosed in Patrick U. S. Patent No. 2,258,099 to prepare alumina hydrosols by treating aluminum with mercuric acetate to secure an amalgamated aluminum and treating the latter with a dilute organic acid as for example, dilute acetic acid at a temperature in the range from about 80° F. to 150° F. The mixture is allowed to stand usually for a period from about 1 to 12 hours. By this process a dilute alumina hydrosol solution containing from about 1% to about 3% alumina hydrosol is usually obtained. Toward the end of the period the reaction becomes quite slow. The dilute alumina hydrosol solution is usually concentrated at temperatures not exceeding about 150° F. The concentrated hydrosol solution comprises about 5 to 7% alumina. This colloidal solution of hydrous alumina will set to a hydrogel upon standing or upon treatment with certain coagulating agents.

These hydrosols are used in many ways. They may be dried and used as an aluminum gel or they may be treated with various acids or alkalies to produce hydrogels. These gels, as is known in the art, are employed as adsorbents, catalysts and as base carriers for catalysts in various chemical and related processes.

In accordance with my invention, I have found that by introducing air or oxygen containing gas into the mixture of amalgamated aluminum and dilute acid, the rate of sol formation is greatly increased with the result that hydrosols of above 5% concentration can be prepared directly without concentration within a relatively short period of time.

The process of my invention may be readily understood by the following examples illustrating the same.

Example 1

Five parts of granulated aluminum were covered with 50 parts of water containing 0.125 part of mercuric acetate. After 5 minutes this water was drained off and the amalgamated aluminum was covered with 200 parts of a 1.25% solution of acetic acid. The mixture was blown with natural gas by means of a pipe extending to the bottom of the vessel. The average temperature was approximately 80° F. At the end of 5 hours there was obtained an alumina sol which contained only 1.1% $Al_2O_3$.

Example 2

Five parts of granulated aluminum were covered with 50 parts of water containing 0.125 part of mercuric acetate. After 5 minutes the water was drained off and the amalgamated aluminum was covered with 200 parts of 1.25% acetic acid solution. The mixture was blown with air by means of a pipe extending to the bottom of the vessel. Approximately 2 cu. ft. of air per hour was used per 200 cu. cc. of solution. The average temperature was approximately 80° F. At the end of five hours there was obtained an alumina sol containing 5.7% $Al_2O_3$.

A small amount of lauryl alcohol was used as an anti-foam agent in each of these examples.

The process of my invention may be widely varied. It broadly covers treating the amalgamated aluminum acid mixture with an oxygen containing gas. The reaction may be carried out in any satisfactory type of apparatus, as for example, a column packed with amalgamated aluminum down which dilute acid, preferably acetic acid, trickles while a current of air or other oxygen containing gas is passed upwardly through the column. The hydrosol may be drawn off at the bottom of the column into a settler and separated from the sludge containing mercury.

Any satisfactory acid may be employed in treating the amalgamated aluminum, however, it is preferred that a dilute acetic acid having a concentration of from 0.5 to 2% be employed.

The concentration of the hydrosol can be adjusted to any desired value by controlling the concentration, the temperature and the rate of the feed of the dilute acid solution. The concentration can also be controlled by the regulation of the temperature and rate of introduction of the air stream. For example, heated air can be used to evaporate considerable quantities of water, thus, concentrating the solution while the oxygen in the air promotes the reaction. The concentration of the hydrosol product can also be regulated by controlling the height of the column and the shape and size of the aluminum metal used.

The amount of oxygen containing gas may vary considerably, depending upon the amount of oxygen present and also depending upon the temperatures employed. In general it is preferred to treat with 100 volumes of air to 500 volumes of air measured at standard conditions per volume of dilute acetic acid.

What I claim as new and wish to protect as Letters Patent is:

1. In the process for the production of alumina hydrosols by contacting amalgamated aluminum with a dilute aqueous solution of an organic acid, the improvement which comprises blowing the reaction mixture of amalgamated aluminum and acid with an oxygen-containing gas thereby substantially increasing the rate at which the alumina hydrosol is formed.

2. Process in accordance with claim 1 in which said oxygen containing gas is air.

3. In the process for the preparation of alumina hydrosols by contacting amalgamated aluminum with a dilute aqueous acetic acid solution of from 0.5 to 2% concentration at a temperature from 80° F. to 150° F. for a period of from 1 to 12 hours, the improvement which comprises contacting this amalgamated aluminum and acetic acid solution with an oxygen containing gas thereby substantially increasing the rate at which the alumina hydrosol is formed.

4. Process in accordance with claim 3 in which said oxygen containing gas is air.

CHARLES N. KIMBERLIN, Jr.

REFERENCES CITED

The following references are of record in the file of this patent:

UNITED STATES PATENTS

| Number | Name | Date |
|---|---|---|
| 2,258,099 | Patrick | Oct. 7, 1941 |
| 2,328,846 | Pitzer | Sept. 7, 1943 |
| 2,369,734 | Heard | Feb. 20, 1945 |
| 2,371,237 | Heard | Mar. 13, 1945 |

OTHER REFERENCES

Mellor: Comprehensive Treatise on Inorganic and Theoretical Chemistry, volume 5, page 242.